US006678130B2

(12) United States Patent
Ratner et al.

(10) Patent No.: US 6,678,130 B2
(45) Date of Patent: Jan. 13, 2004

(54) VOLTAGE REGULATOR WITH ELECTROSTATIC DISCHARGE SHUNT

(75) Inventors: Steven J. Ratner, Santa Clara, CA (US); Hyoung Jo Youn, San Jose, CA (US); Leandro A. Chua, Jr., Redwood City, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 244 days.

(21) Appl. No.: 09/819,293

(22) Filed: Mar. 27, 2001

(65) Prior Publication Data

US 2002/0171984 A1 Nov. 21, 2002

(51) Int. Cl.[7] .................................................. H02H 7/00

(52) U.S. Cl. ............................ 361/18; 361/56; 361/88; 361/91.1; 361/91.5; 361/111; 361/117; 361/118

(58) Field of Search ............................ 361/56, 90, 18, 361/111, 117–119, 88, 91.1, 91.5

(56) References Cited

U.S. PATENT DOCUMENTS

| | | | | | |
|---|---|---|---|---|---|
| 5,212,616 | A | * | 5/1993 | Dhong et al. | 361/18 |
| 5,337,205 | A | * | 8/1994 | Haun et al. | 361/56 |
| 5,465,188 | A | * | 11/1995 | Pryor et al. | 361/18 |
| 6,201,674 | B1 | * | 3/2001 | Warita et al. | 361/18 |

* cited by examiner

*Primary Examiner*—Gregory J. Toatley, Jr.
*Assistant Examiner*—Isabel Rodriguez
(74) *Attorney, Agent, or Firm*—Judy Liao Shie

(57) ABSTRACT

An electronic circuit consists of a voltage regulator and an electrostatic discharge (ESD) shunt. The voltage regulator maintains a prescribed voltage for the voltage supply of the chip. The ESD shunt protects the chip circuitry from undesirable levels of current or voltage. The voltage regulator and the ESD shunt share the functionality of a single, very large transistor. This combination results in a circuit with a smaller area, much smaller than if the two circuits had been built separately. With the reduction in area, both circuits can be manufactured on a single chip.

8 Claims, 1 Drawing Sheet

VOLTAGE REGULATOR WITH ELECTROSTATIC DISCHARGE SHUNT

BACKGROUND OF THE INVENTION

The present invention relates generally to the field of electronic circuits and, more particularly, to the field of voltage regulation and ESD protection on semiconductor chips.

In integrated circuit design, there are two functions that are often required by a chip. One function is voltage regulation of a power supply. Fluctuations in the power supply to a chip can adversely affect the performance of an integrated circuit. To prevent this, the power supply is regulated with a voltage regulator. The purpose of a voltage regulator is to maintain a steady, stable voltage for the chip to use as its power supply. A very large transistor is used in such a voltage regulator to supply the large amount of current required by a chip.

A second function almost always found on a chip is electrostatic discharge (ESD) protection. ESD events are a hazard from which a chip must be protected, since they are an unfortunately common occurrence. For example, a person can generate thousands of volts in static electricity by simply walking across a carpet. If that same person were to touch an unprotected chip immediately afterwards, the high-voltage static electricity discharged between the person and the chip could permanently damage the chip and render it inoperable. An ESD shunt built into the chip can prevent such damage from happening. In order to cope with the high current generated during an ESD event, an ESD shunt has very large transistors built into its circuit that divert the current safely to ground.

An important goal in integrated circuit design is to minimize the area that a circuit takes up on a chip. The amount of area available on a chip is at a premium, and very expensive. However, since both the voltage regulator and the ESD shunt include very large transistors in their circuits, it was difficult in the past to fit both circuits on one chip. Although there have been a few instances where chips have been known to include both a voltage regulator and an ESD shunt, those instances are very rare, and occur only because either the voltage regulator is very small and supplies just a sub-circuit of the chip, or because there was enough extra area available on the chip. Both scenarios are highly unusual and unlikely. Additionally, the voltage regulator and ESD shunt were never before combined into one circuit. If these two circuits appeared together on a chip at all, they appeared as two separate circuits. The majority of chip designs typically include the ESD shunt on-chip, while the voltage regulator is an off-chip component found on a PC board, or in the power supply itself.

This arrangement is problematic for several reasons. First, placing the voltage regulator off-chip may introduce noise into the power supply. Furthermore, the cost of building the voltage regulator as a separate component, with separate packaging and a separate manufacturing process, can be expensive. And finally, some chip designs operate at two different voltages. With the voltage regulator off-chip, two valuable input/output (I/O) pins on the chip are needed to provide two separate voltage supplies to the chip. If it were possible to include the voltage regulator on-chip instead, the voltage regulator could use one voltage to generate a second voltage.

SUMMARY OF THE INVENTION

In accordance with an illustrated preferred embodiment of the present invention, the voltage regulator and the ESD shunt are both incorporated into one combined circuit. The present invention achieves this by sharing the functionality of one of the very large transistors between the voltage regulator and the ESD shunt. In this way, the area required by this combined circuit is greatly reduced. In fact, the area required by the combined circuit is not much larger than the area of just the ESD shunt alone.

Because of this significant reduction in area, the voltage regulator and the ESD shunt can now be manufactured together on a single chip with ease. The advantages of this arrangement are many. It allows the voltage regulator to be much closer to the power supply of the chip, which reduces the possibility of noise on the power line. Additionally, there is no longer a need to use a separate component for the voltage regulator, saving on manufacturing costs. Finally, this arrangement allows chip designs that operate at two separate voltages to use a first voltage to generate a second one, saving a valuable I/O pin in the process.

Further features and advantages of the present invention, as well as the structure and operation of preferred embodiments of the present invention, are described in detail below with reference to the accompanying exemplary drawings.

DETAILED DESCRIPTION OF THE PREFERRED EMBODIMENT

Figure 1:
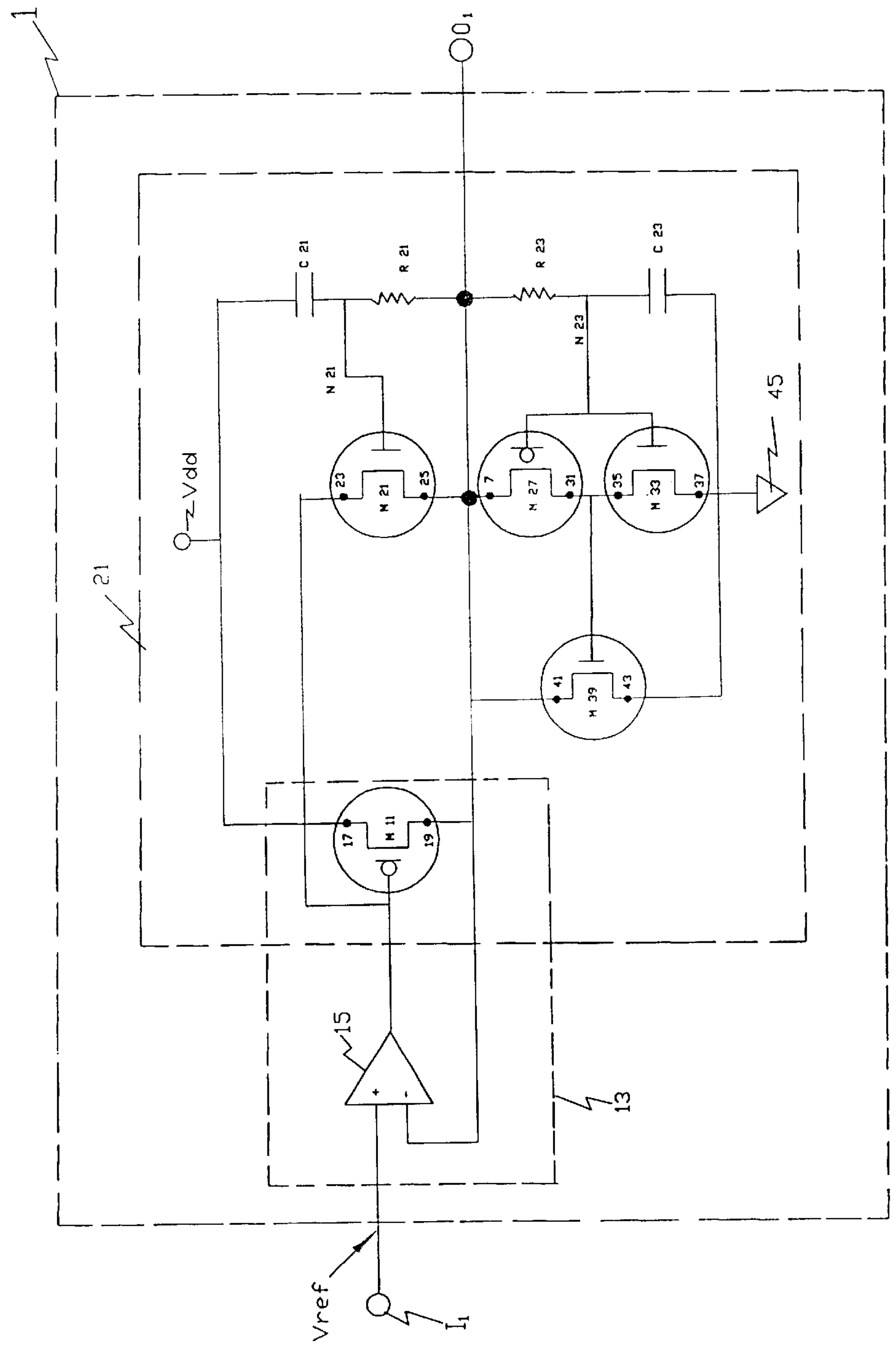
FIG. 1 shows a schematic of the preferred embodiment of the invention.

Hereinafter, the following definitions will apply:

Electrical parameter—an electrical characteristic of a circuit such as current or voltage.

Protective circuit—circuitry designed to protect other circuitry from undesirable levels of current or voltage. An Electrostatic Discharge (ESD) is one example of an event a protective circuit would be designed to guard against.

FIG. 1 shows a preferred embodiment made in accordance with the teachings of the present invention. An on-chip voltage regulator and ESD shunt 1 consists of a voltage regulator 13 and an ESD protection circuit 21. The on-chip voltage regulator and ESD shunt 1 has an input $I_1$ and an output $O_1$. The one component both the voltage regulator 13 and the ESD protection circuit 21 have in common is a P-MOSFET transistor M11.

The voltage regulator 13 consists of an operational amplifier (op-amp) 15 and the transistor M11 in series with the output $O_1$. The op-amp 15 is a circuit well known in the art and may be implemented using any one of a number of op-amp designs. A reference voltage Vref is applied at the input $I_1$, which connects to the non-inverting (+) input of the op-amp 15. The output of the op-amp 15 is connected to the gate of the transistor M11 and controls the amount of current flowing through transistor M11. The source 17 of transistor M11 is connected to a supply voltage Vdd. The drain 19 of transistor M11 is also the output $O_1$, which is connected through a feedback loop back to the inverting (−) input of the op-amp 15. The voltage regulator 13 is designed to provide enough current to adequately supply a load on the output $O_1$, as well as maintain a steady voltage at the output $O_1$. If the voltage regulator 13 is used to regulate a voltage supply on a chip, the many devices on the chip present a large load to the output $O_1$. Therefore, transistor M11 is typically very large in order to supply the amount of current the load on output $O_1$ may draw. The voltage regulator 13 is a common circuit well known to those having ordinary skill in the art and can be found in P. Gray and R. Meyer, Analysis and Design of Analog Integrated Circuits, John Wiley & Sons, Inc., 584–591 (1993, third edition)

The ESD shunt 21 is designed to meet the requirements of United States military specification (mil-spec) 883, also known as the human body model. The following components are connected in series between the supply voltage Vdd and a ground supply 45: capacitor C21, resistor R21, resistor R23, and capacitor C23, respectively. A node N21 between capacitor C21 and resistor R21 is connected to the gate of an N-MOSFET transistor M21. The drain 23 of transistor M21 leads to the gate of transistor M11, which is connected as described in the voltage regulator 13. The source 25 of transistor M21 connects to output $O_1$, which is also the node between resistor R21 and resistor R23.

A node N23 between resistor R23 and capacitor C23 is connected to the gates of a P-MOSFET transistor M27 and an N-MOSFET transistor M33. Transistor M27 and transistor M33 are connected together in an inverter arrangement—the two transistors function such that the output at their connected drains is the inverse of the signal at their gates. The drain 31 of transistor M27 and the drain 35 of transistor M33 lead to the gate of an N-MOSFET transistor M39. The source 37 of transistor M33 and the source 43 of transistor M39 connects to the ground supply 45, while the source 29 of transistor M27 and the drain 41 of transistor M39 connect to output $O_1$.

In an ESD event, the voltage differential between supply voltage Vdd and ground supply 45 spikes dramatically. The purpose of ESD circuitry is to give the voltage spike and resulting high current a pathway through which it can safely drain to a ground supply, without passing through and damaging other devices in the circuit.

When the voltage on supply voltage Vdd spikes up in response to an ESD event, the voltage at node N21 spikes up with it, since the voltage across capacitor C21 cannot change instantaneously. Transistor M21 switches on, pulling the voltage on the gate of transistor M11 low. Transistor M11 then also switches on, which opens a pathway for the voltage spike on supply voltage Vdd to drain to output $O_1$.

The voltage spike on supply voltage Vdd draining onto output $O_1$ creates another smaller voltage spike on output $O_1$. This can be interpreted as another ESD event. Although the voltage on output $O_1$ spikes up, the voltage at node N23 remains low because the voltage across capacitor C23 cannot change instantaneously. A low voltage at node N23 is inverted by the inverter arrangement of transistor M27 and transistor M33, pulling the gate of transistor M39 high. Transistor M39 switches on, opening the pathway for the voltage spike on output $O_1$ to drain through to ground supply 45. With both transistor M11 and transistor M39 switched on, there is a pathway for the current generated by the ESD event to drain from supply voltage Vdd to ground supply 45.

After the ESD event occurs and some time has passed, the voltage at supply voltage Vdd will begin to drop as the ESD event ends and the high voltage on supply voltage Vdd drains through the pathway formed by switching on transistor M11 and transistor M39. As a result, the voltage at node N21 will also subsequently drop, and at some point, the voltage at node N21 will be too low to keep transistor M21 on. Transistor M21 switches off, no longer pulling the voltage at the gate of transistor M11 low, so transistor M11 switches off. Similarly, as the capacitor C23 charges up from the ESD event, the voltage at node N23 will begin to rise. The inverter arrangement of transistor M27 and transistor M33 will invert the voltage at node N23, pulling the gate of transistor M39 low and shutting transistor M39 off. With both transistor M11 and transistor M39 switched off, the pathway between supply voltage Vdd and ground supply 45 is disconnected.

For correct operation of the ESD circuit 21, the values of resistors R21 and R23 and capacitors C21 and C23 are chosen such that the time constants R21×C21 and R23×C23 are very large, much larger than the time period of an ESD event specified in mil-spec 883. This ensures that transistor M11 and transistor M39 do not shut off too soon. Additionally, transistor M11 and transistor M39 must be very large in order to handle the large amount of current generated by an ESD event. The ESD circuit 21 is a common circuit well known to those having ordinary skill in the art.

Both the voltage regulator 13 and the ESD protection circuit 21 are designed using Simulation Program with Integrated Circuit Emphasis (SPICE), a circuit simulator well known to those having ordinary skill in the art. The voltage regulator 13 and the ESD protection circuit 21 are initially designed independently of each other. After the voltage regulator 13 and the ESD protection circuit 21 are able to meet specification independently, the two circuits are combined into one: the on-chip voltage regulator and ESD shunt 1.

The voltage regulator 13 is designed by running SPICE simulations while sweeping the output loads at output $O_1$ through the full range that could be experienced during the course of normal operation. The size of the op-amp 15 and the transistor M11 are each tweaked until any voltage swing at the output $O_1$ is within the acceptable limits set by specifications.

The ESD protection circuit 21 is designed to the specifications of mil-spec 883. SPICE simulations that re-create the conditions as described in mil-spec 883 are run on the ESD protection circuit 21. The values of the devices within the ESD protection circuit 21 are tweaked until it performs as required by mil-spec 883.

After the voltage regulator 13 and the ESD protection circuit 21 have been designed according to their respective specifications, the two circuits are merged as described earlier, by sharing the transistor M11. SPICE simulations are then rerun to verify that the new circuit as a whole still meets the same specifications the voltage regulator 13 and the ESD protection circuit 21 did before the circuits merged.

Table 1 below lists exemplary device values for an actual embodiment of a particular SPICE simulation made in accordance with the teachings of the present invention. The values are for a 0.28-micron CMOS process. Notice that the transistor M11 shared by the voltage regulator 13 and the ESD protection circuit 21 is very large relative to the sizes of the other transistors. These device values have been given by way of example only, and are not intended to be limiting on the present invention.

TABLE 1

| Reference number | Value |
|---|---|
| M11 | W = 16063 um; L = 0.3 um |
| M21 | W = 500 um; L = 0.3 um |
| M27 | W = 500 um; L = 0.3 um |
| M33 | W = 100 um; L = 0.3 um |
| M39 | W = 8500 um; L = 0.3 um |
| C21 | 2.8 pF |
| R21 | 330 kohms |

TABLE 1-continued

| Reference number | Value |
|---|---|
| R23 | 330 kohms |
| C23 | 2.8 pF |

Rather than designing the voltage regulator 13 and the ESD protection circuit 21 separately and then integrating them into one circuit, as was described previously, an alternative method can be used. The on-chip voltage regulator and ESD shunt 1 can also be designed as one complete circuit by simulating it in its entirety, thereby skipping the process of having to run separate simulations on its two sub-circuit components.

Although the present invention has been described in detail with reference to a particular preferred embodiment, persons possessing ordinary skill in the art to which this invention pertains will appreciate that various modifications and enhancements may be made without departing from the spirit and scope of the claims that follow.

We claim:

1. A circuit, comprising:

a voltage regulator with at least one input and output, wherein a reference voltage is applied at the input to maintain a prescribed voltage at the output, the output being controlled by an output stage; and a protective circuit that shares the output stage of the voltage regulator, the output stage providing a pathway for discharge of an undesirable current or voltage.

2. The circuit as defined in claim 1, wherein the voltage regulator and the protective circuit are located on the same chip.

3. The circuit as defined in claim 2, wherein the output stage of the voltage regulator is an output driver in series with the output.

4. The circuit as defined in claim 3, wherein the output driver is a transistor.

5. A method for combining a voltage regulator and protective circuitry into one circuit, comprising the steps of:

applying an input voltage;

maintaining an output voltage at a prescribed level in response to changes in the input voltage;

generating the output voltage via an output stage of the voltage regulator;

shunting an undesirable current or voltage through the output stage of the voltage regulator.

6. The method of claim 5, further comprising the step of:

placing both the voltage regulator and protective circuitry entirely on one chip.

7. The method of claim 6, further comprising the step of:

using an output driver in series with the output as the output stage.

8. The method of claim 7, further comprising the step of:

using a transistor as the output driver.

* * * * *